United States Patent
Prasad et al.

(10) Patent No.: US 10,171,364 B2
(45) Date of Patent: Jan. 1, 2019

(54) METHOD AND APPARATUS FOR OPTIMIZING TRANSMISSIONS IN WIRELESS NETWORKS

(71) Applicant: Nokia Technologies Oy, Espoo (FI)

(72) Inventors: Athul Prasad, Helsinki (FI); Jari Petteri Lunden, Espoo (FI); Martti Johannes Moisio, Klaukkala (FI); Mikko Aleksi Uusitalo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 249 days.

(21) Appl. No.: 14/553,010

(22) Filed: Nov. 25, 2014

(65) Prior Publication Data

US 2016/0149818 A1    May 26, 2016

(51) Int. Cl.
| | |
|---|---|
| *H04W 4/00* | (2018.01) |
| *H04W 52/02* | (2009.01) |
| *H04W 72/12* | (2009.01) |
| *H04L 12/851* | (2013.01) |
| *H04L 12/841* | (2013.01) |
| *H04L 29/06* | (2006.01) |
| *H04W 8/00* | (2009.01) |
| *H04W 76/14* | (2018.01) |
| *H04W 92/00* | (2009.01) |

(52) U.S. Cl.
CPC ........ *H04L 47/2433* (2013.01); *H04L 47/283* (2013.01); *H04L 65/4076* (2013.01); *H04W 8/005* (2013.01); *H04W 52/0219* (2013.01); *H04W 76/14* (2018.02); *H04W 92/00* (2013.01); *Y02D 70/00* (2018.01); *Y02D 70/1262* (2018.01); *Y02D 70/1264* (2018.01); *Y02D 70/21* (2018.01)

(58) Field of Classification Search
CPC ............. H04L 47/2433; H04L 47/283; H04L 65/4076; H04W 52/0219; H04W 76/023; H04W 76/14; H04W 8/005; H04W 92/00; H04W 4/00; H04W 72/1242
USPC .......................................................... 370/236
See application file for complete search history.

(56) References Cited

U.S. PATENT DOCUMENTS

| | | |
|---|---|---|
| 8,520,575 B2 | 8/2013 | Doppler et al. |
| 8,839,362 B2 | 9/2014 | Jung et al. |
| 2009/0053994 A1 | 2/2009 | Senarath et al. |
| 2009/0325512 A1* | 12/2009 | Granlund ................ H04L 47/14 |
| | | 455/91 |
| 2012/0300695 A1 | 11/2012 | Higuchi |

(Continued)

OTHER PUBLICATIONS

Zhou et al. "Intracluster Device-to-Device Relay Algorithm with Optimal Resource Utilization", IEEE Transactions on Vehicular Technology, vol. 62, No. 5, Jun. 2013, pp. 2315-2326.*

(Continued)

*Primary Examiner* — Edan Orgad
*Assistant Examiner* — Vanneilian Lalchinthang
(74) *Attorney, Agent, or Firm* — Harrington & Smith

(57) ABSTRACT

Various communication systems may benefit from optimized transmissions. A method can include receiving data to be forwarded to a first wireless device. The method can also include determining the data as delay tolerant data. Moreover, the method can include defining a role of at least one second wireless device for forwarding the delay tolerant data. Also, the method can include transmitting the delay tolerant data to the second wireless device to be forwarded to the first wireless device.

20 Claims, 5 Drawing Sheets

D2D multicast coverage area

(56) References Cited

U.S. PATENT DOCUMENTS

| | | | | |
|---|---|---|---|---|
| 2013/0235779 | A1* | 9/2013 | Kang | H04W 52/0216 370/311 |
| 2013/0324104 | A1* | 12/2013 | Cavilla | H04W 72/1242 455/422.1 |
| 2014/0031028 | A1 | 1/2014 | Yamada et al. | |
| 2014/0056220 | A1* | 2/2014 | Poitau | H04W 40/246 370/328 |
| 2014/0112162 | A1 | 4/2014 | Tavildar et al. | |
| 2014/0241265 | A1* | 8/2014 | Pragada | H04W 72/04 370/329 |
| 2014/0302850 | A1* | 10/2014 | Young | H04W 88/04 455/436 |
| 2015/0036578 | A1* | 2/2015 | Wu | H04W 8/005 370/312 |
| 2015/0117293 | A1* | 4/2015 | Cho | H04W 76/002 370/312 |
| 2015/0208344 | A1* | 7/2015 | Zhang | H04W 52/0216 370/311 |

OTHER PUBLICATIONS

Dobrev et al., "Device and Service Discovery in Home Networks With OSGI", IEEE Communications Magazine, vol. 40, Issue: 8, Aug. 2002, pp. 86-92.

"3rd Generation Partnership Project;Technical Specification Group RAN;Study on LTE Device to Device Proximity Services-Radio Aspects; (Release 12)", 3GPP TR 36.843, V0.2.0, Oct. 2013, pp. 1-21.

"3rd Generation Partnership Project; Technical Specification Group Services and System Aspects; Multimedia Broadcast/Multicast Service (MBMS); Architecture and Functional Description (Release 12)", 3GPP TS 23.246, V12.1.0, Mar. 2014, pp. 1-67.

Lecompte et al., "Evolved Multimedia Broadcast/Multicast Service (eMBMS) in LTE-Advanced: Overview and Rel-11 Enhancements", IEEE Communications Magazine, vol. 50, Issue: 11, Nov. 2012, pp. 68-74.

Lauridsen et al., "Empirical LTE Smartphone Power Model with DRX Operation for System Level Simulations", IEEE 78th Vehicular Technology Conference, Sep. 2-5, 2013, 6 pages.

Auer et al., "Energy Efficiency Analysis of the Reference Systems, Areas of Improvements and Target Breakdown", INFSO-ICT-247733 Earth, Deliverable D2.3, Version: 2.00, Jan. 31, 2012, pp. 1-68.

"Intracluster Device-to-Device Relay AlgorithmWith Optimal Resource Utilization", IEEE Transactions on Vehicular Technology, vol. 62, No. 5, Jun. 2013, pp. 2315-2326.

Extended European Search Report received for corresponding European Patent Application No. 15186428.7, dated Apr. 20, 2016, 9 pages.

Li et al., "Optimal Mobile Content Downloading in Device-to-Device Communication Underlaying Cellular Networks", IEEE Transactions on Wireless Communications, vol. 13, No. 7, Jul. 2014, pp. 3596-3608.

Mumtaz et al., "Direct Mobile-to-Mobile Communication: Paradigm for 5G", IEEE Wireless Communications, vol. 21, No. 5, Oct. 2014, pp. 14-23.

Militano et al., "Wi-Fi Cooperation or D2D-based Multicast Content Distribution in LTE-A: A Comparative Analysis", IEEE International Conference on Communications Workshops, 2014, pp. 296-301.

Office action received for corresponding European Patent Application No. 15186428.7, dated Sep. 20, 2017, 6 pages.

* cited by examiner

METHOD AND APPARATUS FOR OPTIMIZING TRANSMISSIONS IN WIRELESS NETWORKS

TECHNICAL FIELD

The present application relates generally to optimizing transmissions in wireless networks.

BACKGROUND

Long-term Evolution (LTE) is a standard for wireless communication that seeks to provide improved speed and capacity for wireless communications by using new modulation/signal processing techniques. The standard was proposed by the 3$^{rd}$ Generation Partnership Project (3GPP), and is based upon previous network technologies. Since its inception, LTE has seen extensive deployment in a wide variety of contexts involving the communication of data.

Multicast and broadcast communications from cells to user equipments (UEs) were first introduced in 3G systems and consequently further enhanced for 4G LTE systems. Such types of communications are commonly referred to as enhanced Multicast Broadcast Multimedia Systems (eM-BMS). The main enhancements are currently related to using synchronized reception from multiple MBMS cells with a MBMS single frequency network area, with all cooperating cells using similar physical layer transmission parameters.

Device-to-device (D2D) communications are currently being standardized by the 3GPP in the contexts of LTE and LTE Advanced (LTE-A). Limited mechanisms required for public safety applications using D2D are standardized as a part of 3GPP LTE release 12 specification process.

SUMMARY

According to certain embodiments, an apparatus may comprise at least one processor and at least one memory including computer program code. The at least one memory and the computer program code can be configured to, with the at least one processor, cause the apparatus at least to receive data to be forwarded to a first wireless device. The at least one memory and the computer program code can also be configured to, with the at least one processor, cause the apparatus at least to determine the data as delay tolerant data. Moreover, the at least one memory and the computer program code can also be configured to, with the at least one processor, cause the apparatus at least to define a role of at least one second wireless device for forwarding the delay tolerant data. Also, the at least one memory and the computer program code can also be configured to, with the at least one processor, cause the apparatus at least to transmit the delay tolerant data to the second wireless device to be forwarded to the first wireless device.

According to certain embodiments, a method can include receiving data to be forwarded to a first wireless device. The method can also include determining the data as delay tolerant data. Moreover, the method can include defining a role of at least one second wireless device for forwarding the delay tolerant data. Also, the method can include transmitting the delay tolerant data to the second wireless device to be forwarded to the first wireless device.

According to certain embodiments, an apparatus may comprise at least one processor and at least one memory including computer program code. The at least one memory and the computer program code can be configured to, with the at least one processor, cause the apparatus at least to determine a role of the apparatus in a network. The at least one memory and the computer program code can also be configured to, with the at least one processor, cause the apparatus at least to receive delay tolerant data to be forwarded to a wireless device. Moreover, the at least one memory and the computer program code can also be configured to, with the at least one processor, cause the apparatus at least to transmit the delay tolerant data to the wireless device.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Embodiments of the invention relate to optimizing transmissions in wireless networks to save power and avoid unnecessary power consumption.

Power consumption of a wireless network may be considered using power consumption models of user equipments (UEs) and base stations (BSs), such as evolved Node Bs (eNBs). In case of UEs the power consumption remains almost constant if the transmit power is less than 0 dBm and increases almost linearly above 0 dBm. On the other hand, when receiving, the power consumption of UEs remains almost constant usually. This may however depend on various parameters. In case of LTE BSs, it is assumed that such devices have a linear, load dependent power consumption model, wherein load depends on the number of physical resource blocks (PRBs) scheduled with data in each downlink transmission.

Even though it is understood that BSs have significantly higher power consumption compared to the power consumption of UEs, there is still a challenge; how to minimize power consumption of BSs. In practice it may be desirable to minimize the power consumption of an entire network, including BSs and UEs as well.

In general BSs need to use a robust modulation and coding scheme (MCS) to provide coverage to UEs experiencing worst coverage conditions in a region. The use of a robust MCS always leads to a higher load due to the fact that more resources are needed to transmit the same amount of data, compared to the use of a less robust MCS. Since more resources are needed when using a robust MCS, such operation results in higher power consumption. Especially in multicast environments, with Multi-media Broadcast over a Single Frequency Network (MBSFN) regions, it is difficult to achieve energy-efficiency and minimize power consumption. At the moment further improvements are not possible even for delay tolerant data due to the inherent limitations of the system.

In view of the above-described shortcomings, certain embodiments of the invention may improve energy-efficiency of wireless networks by minimizing the power consumption of BSs and/or the entire network in question. Embodiments of the invention enable improved energy-efficiency by jointly optimizing multicast transmissions in a D2D environment with the cooperation of BSs and UEs. This optimization and the proposed method according to embodiments of the invention lead to reduction in resource usage and energy consumption. Embodiments of the invention are compatible with LTE and LTE-A, and have also the capability to be compatible with other and any new reference network architectures, such as 5G for example.

Figure 1A:
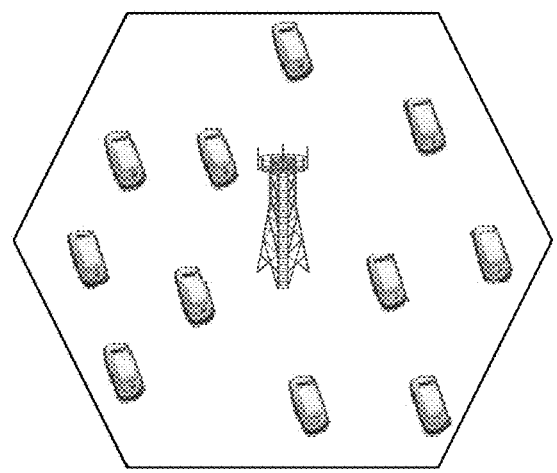
FIG. 1a illustrates a regular Multimedia Broadcast/Multicast Service coverage area.

In FIG. 1a, a regular Multimedia Broadcast/Multicast Service coverage area is presented. According to the current operation, the BS has to use a robust MCS to ensure coverage for all UEs. In some cases, the received power level within a service coverage area of the BS is the lowest in case of cell-edge UEs and hence the BS needs to select a suitable MCS accordingly. In this case the direct coverage area of the BS, that is the coverage area wherein the BS serves UEs directly, comprises all UEs within the service coverage of the BS.

Figure 1B:
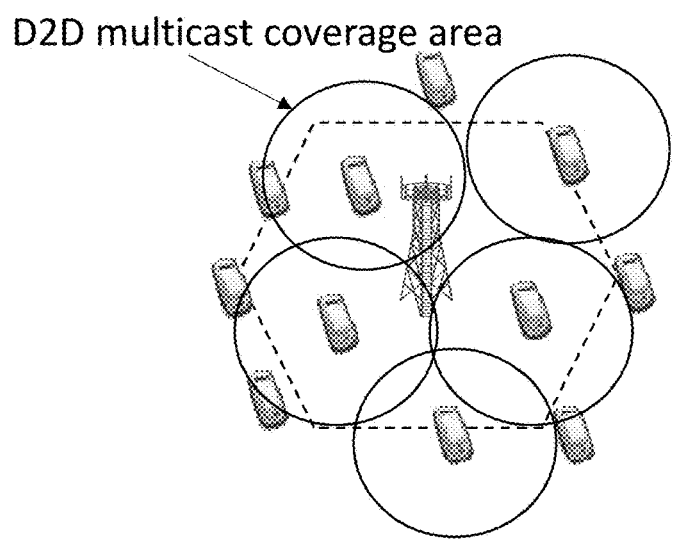
FIG. 1b illustrates an optimized macro MBMS coverage are with D2D multicast.

FIG. 1b depicts an optimized macro MBMS coverage area with D2D multicast. Due to the use of a combination of macro and D2D multicast communications, the number of UEs that the BS has to serve directly is smaller. In this example case, the cell-edge UEs are served by using D2D multicast transmissions. Therefore the direct coverage area of the BS is reduced which reduces power consumption. In other words, in both FIGS. 1a and 1b the service coverage area of the BS is the same, but in FIG. 1b the direct coverage area of the BS is smaller due to the exploitation of D2D multicast transmissions. As shown in FIG. 1b, there may be multiple D2D multicast coverage areas within the service coverage area of the BS, and possibly even extending the service coverage area of the BS.

According to embodiments of the invention, the multicast coverage area is not optimized since the service coverage area of the BS may remain the same. Instead embodiments of the invention enable reduction in the transmit power consumption of the BS, as depicted in FIG. 1b on a general level, by reducing the load of the BS. This further leads to reduced total power consumption in the network in question.

Certain embodiments of the invention may enable a BS or a macro cell to compute transmission parameters to be used to minimize resource usage in a network which leads to reduced power consumption. The BS or the macro cell may estimate physical layer parameters to cover an optimal amount of UEs. Consequently the load of the BS or the macro cell would be minimized. That is to say, the BS or the macro cell would serve directly only a part of the UEs within the service coverage area while the rest of the UEs would be covered by D2D UEs by exploiting D2D multicast communications. Embodiments of the invention make it possible that the BS has complete control of the operation and it may optimize resource usage and power consumption of the network.

Figure 2:
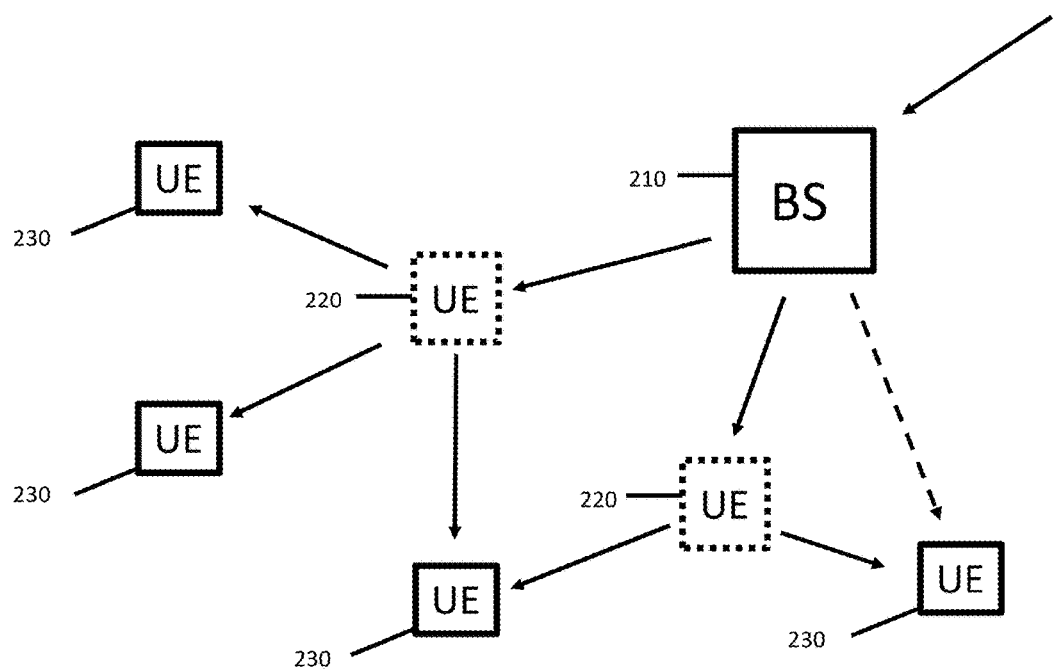
FIG. 2 illustrates an example of a network scenario in accordance with embodiments of invention.

The following provides examples of how this could be achieved. FIG. 2 represents an example of a network scenario according to embodiments of the invention. A base station (210) may receive delay tolerant data from a core network and possibly start a device-to-device discovery process as a consequence. If the BS (210) decides to start the D2D discovery process, it may do so by transmitting a configuration message to all UEs (220, 230) within the service coverage area of the BS (210). The configuration message may be transmitted as a part of system information blocks.

Upon receiving the configuration message the UEs (220, 230) may transmit one or more discovery beacons, possibly for a predetermined time, and also receive discovery beacons from neighboring nodes. In addition, the UEs (220, 230) may measure signal strengths of the received discovery beacons and create a measurement report based, at least in part, on the measured information. The measurement reports may be transmitted to the base station (210).

Once the base station has received the measurement reports, it may optimize its power consumption. Alternatively, or in addition, the BS (210) may jointly optimize the power consumption of the entire network, by considering the power consumption of UEs (220, 230) within the service coverage area in addition to the power consumption of the BS (210). Such optimization of power consumption may be beneficial especially in case of delay tolerant data.

The base station may also receive information about the capabilities of UEs (220, 230) within the service coverage area of the BS (210). Based on this information and the received measurement reports, the BS (210) may estimate transmission parameters required to cover all UEs (220, 230) by using a combination of macro and D2D multicast communications.

Furthermore, the BS (210) may also define roles of the UEs (220, 230). The role of a UE (220, 230) may be at least one of multicast broadcast multimedia systems data receiver, device-to-device multicast transmitter and device-to-device multicast data receiver. After defining the roles of the UEs (220, 230), the BS (210) may transmit that information to UEs (220, 230) as a unicast, multicast or broadcast message.

UEs operating as multicast broadcast systems data receivers may receive transmissions directly from one or more BSs. D2D multicast transmitters (220) may transmit data as D2D multicast transmissions to one or more D2D UEs. D2D multicast receivers (230) may receive D2D multicast transmissions from one or more D2D multicast transmitters. In addition, different roles may be combined.

Once the UEs (220, 230) within the service coverage area of the BS (210) are aware of their roles, the UEs (220) operating as D2D multicast transmitters may receive delay tolerant data from the BS (210). The received delay tolerant data may be destined to another D2D UEs (230), possibly operating as a D2D multicast data receiver, and hence the UEs (220) operating as D2D multicast transmitters may need to forward the received delay tolerant data as a multicast transmission. The UEs (220) operating as D2D multicast transmitters may forward the delay tolerant data by using a D2D multicast transmission.

Consequently the UEs (230) operating as D2D multicast data receivers may receive the delay tolerant data from the UEs (220) operating as D2D multicast transmitters. Possibly, the UEs (230) operating as D2D multicast receivers may also receive multicast transmissions from the BS (210), to have more than one attempt to receive each transmission. Alternatively, or additionally, the UEs (230) operating as D2D multicast receivers may attempt to combine different multicast transmissions (cellular and D2D) to improve reliability.

Multicast transmissions made by the D2D UEs (220) may be synchronized, with parameters configured by the BS (210). Synchronization could be performed to create a new-pseudo-MBSFN areas which would enable D2D multicast transmissions to aid each other, instead of acting as sources of interference towards each other.

Synchronization may be done either by synchronizing to a primary and/or a secondary synchronization signal (PSS/SSS) of the base station, or using a MBSFN synchronization signal sent along with LTE system information type 13 (SIB13) related information. Other D2D specific synchronization mechanisms may be possible as well. In addition, or alternatively, D2D capable UEs transmitting or receiving multicast could be configured with a fixed timing (or offset compared to the cellular MBSFN to allow processing) over different cells.

The UEs engaging in D2D communication can decide in a distributed manner whether synchronized multicast transmissions should be used, or asynchronous format should be used, based on radio resource efficiency. This decision could also be taken at the BS, which could estimate the proximity of UEs to each other based on measurement reports from UEs.

Embodiments of the invention may be applied at least for transmission of downlink data. In that case it may be possible not to pass security keys of UEs (230) operating as multicast receivers to UEs (220) operating as D2D multicast transmitters. Hence, UEs (220) operating as D2D multicast transmitters may forward the received delay tolerant data to UEs (230) operating as multicast receivers without decoding the data, if the data is not intended for UEs (220) operating as D2D multicast transmitters. In case of multicast transmissions, security mechanisms for decoding the transmissions may be at the application layer as well.

The generic mechanisms described in accordance with embodiments of the invention are at least applicable to transmission of multicast and broadcast information, and possibly to unicast transmissions as well.

Figure 3:
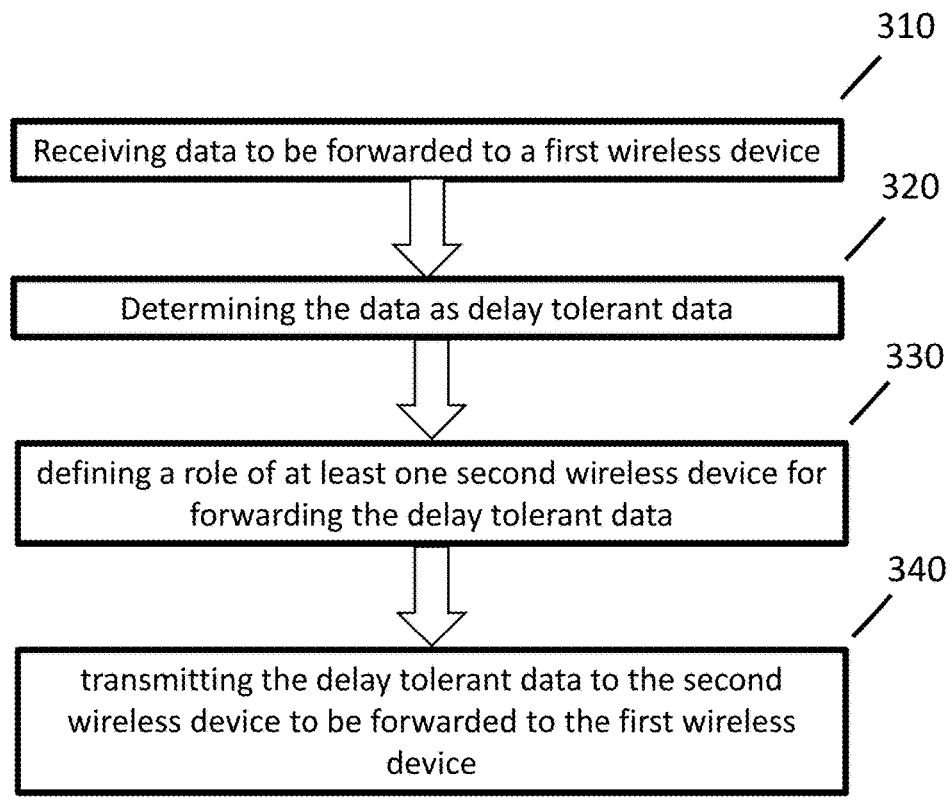
FIG. 3 illustrates a flowchart of a method in accordance with embodiments of the invention.

FIG. 3 illustrates a method according to certain embodiments. As shown in FIG. 3, the method may include, at 310, receiving data to be forwarded to a first wireless device. The method may include receiving the data from a core network. The data may be received via a fixed, wired and/or wireless connection. In certain embodiments, the received data, or at least a part of the received data, may be delay tolerant data.

The method may further include, at 320, determining the received data, or at least a part of the received data, as delay tolerant data. The method may further include determining the received data, or at least a part of the received data, as delay tolerant data by using traffic characteristics, based on information from the core network, etc. Alternatively, or in addition, determination may depend on a data source, and a multicast transmission address as well. These may be combined with already existing bearer parameters or newly defined parameters to indicate that the received data are delay tolerant data.

The method may also include, starting a device-to-device (D2D) discovery process. The process may be started once the received data, or at least a part of the received data, has been determined at step 320 as delay tolerant data. In one embodiment, this process may be initiated by requesting the D2D UEs to do so. The process may be started by transmitting a configuration message to at least one wireless device, user equipment or D2D user equipment within a coverage area of a base station. By requesting UEs to send D2D discovery beacons for a pre-defined period of time, and collecting feedback from all the UEs, it is possible to ensure coverage.

The configuration message may be broadcasted in a new information element, or information elements, in system information blocks (SIBs). The system information blocks may be configured only when it has been determined that delay tolerant data have been received. This way, the signaling required for measurement configurations may be minimized.

Additionally the method may include, receiving a measurement report from at least one D2D UE in response to the transmitted configuration message. The measurement report may include, for example, measured received signal strengths of the at least one D2D UE.

The received measurements reports may be exploited, for example, for determining relative locations of UEs within the service coverage area of the BS. That is to say, the BS may determine physical proximity of UEs with respect to each other based on the received measurement reports. In addition, or alternatively, the BS may also determine possible transmit power consumption due to the D2D multicast transmissions and reception based on the measurement reports.

The method may also include receiving an indication of at least one capability of at least one UE. The indication may be received from the at least one UE directly. Alternatively, the indication may be received from a core network as well. A base station is thus aware of the UE capabilities of each UE within its service coverage area. The at least one capability may be at least one of the following:
ability to transmit and/or receive synchronized D2D multicast transmissions
transmit power class
mobility state
battery information
power preference indicator (PPI)
ability to benefit from battery consumption optimization
physical layer category The indication of a capability of a UE may be received any time. For example, when the UE is connected to the base station. Alternatively the indication may be received periodically, depending on predetermined time intervals. The base station may also receive the indication from a UE when the situation changes, for example, when the PPI or any other capability of the UE changes.

In addition, the method may include, estimating physical layer transmission parameters required to cover all the UEs within a service coverage area of a BS by using a combination of macro cell and D2D multicast transmissions, for defining a role of at least one second device. The method may further include defining the physical layer transmission parameters of the BS required to cover a part of UEs, possibly an optimal number of UEs, directly by the BS. In one embodiment, the method may include defining at least one D2D UE as a D2D multicast transmitter to cover the rest of the wireless devices, for defining a role of at least one second device. The physical layer transmission parameters and D2D multicast transmitters may be chosen to cover all the UEs within a service coverage area of the BS. Hence the BS may have complete control of the operations of the network and may further optimize resource usage and power consumption of the network.

The method may also include, at step 330, defining a role of at least one D2D UE for forwarding the delay tolerant data. The role may comprise at least a role of a D2D multicast transmitter. This may be based on received feedback, i.e., the received measurement reports from at least one user equipment. In addition, or alternatively, this may be based on the received UE capabilities. A base station would have all the required information for making such a decision because it is aware of the UE capabilities and information included in the measurement reports. Alternatively, the decision and related steps may be performed by a software defined network (SDN) controller, cloud base station controller, or centralized base station controller.

The role of at least one D2D UE may be defined by the BS based on the estimated physical layer transmission parameters. The role of the at least one D2D UE may be at least one of multicast broadcast multimedia systems (MBMS) data receiver, device-to-device multicast transmitter and device-to-device multicast receiver.

The method may further include, informing at least one D2D UE about its role. A base station may transmit an indication of the role of the at least one D2D UE to the at least one D2D UE. Alternatively, or in addition, the base station may transmit indications of the roles of multiple D2D UE to the multiple UEs by using broadcast or multicast transmissions. Such indications may be included in one message/data packet.

The method may include, at step 340, transmitting the delay tolerant data to a D2D UE operating as a D2D multicast transmitter. The delay tolerant data may be transmitted to the D2D UE to be forwarded to a D2D UE operating as a D2D multicast receiver. Also, the delay tolerant data may be transmitted in dependence of the defined role.

Figure 4:
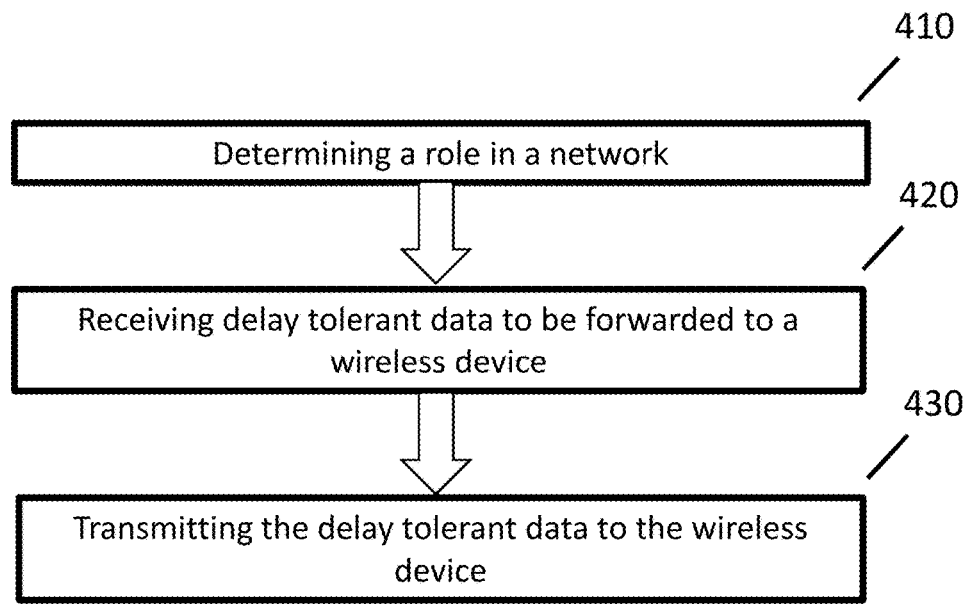
FIG. 4 illustrates a flowchart of a method in accordance with embodiments of the invention.

FIG. 4 illustrates another method according to certain embodiments. The method may include, receiving, by a D2D UE, a configuration message from a base station. The method may also include determining that a D2D discovery process should be started based on the received configuration message. The method may further include transmitting D2D discovery beacons for a predetermined time. In addition, said D2D UE may receive D2D discovery beacons from neighboring D2D UEs and measure signal strength of received D2D discovery beacons. Moreover, the D2D UE may create a measurement report based on the measured information and transmit the measurement report to the base station in response to the received configuration message.

The method may also include, at 410, determining, by a D2D UE a role of said D2D UE in a network. The method may further include receiving, from a BS, an indication of the role of said D2D UE. The determination of the role may be done based on the received indication. The role of the D2D UE may comprise at least one of role of multicast broadcast multimedia systems data receiver, device-to-device multicast transmitter and device-to-device multicast data receiver. In an example embodiment, said D2D UE may determine based on the received indication that its role is the role of the D2D multicast transmitter.

At step 420, the method may include, receiving from a base station delay tolerant data to be forwarded to a wireless device. In one embodiment, the received data may be related to a multicast transmission and possibly especially related to a D2D multicast transmission.

Additionally the method may include, at step 430, transmitting, by a D2D UE, the delay tolerant data to at least one wireless device. Said D2D UE may transmit the delay tolerant data as a multicast transmission, possibly as a D2D multicast transmission. Also, the delay tolerant data may be transmitted in dependence of the determined role.

The method may also include transmitting, by a D2D UE, at least one capability of the D2D UE to a BS. The at least one capability may be at least one of ability to transmit and receive synchronized device-to-device multicast transmissions, transmit power class, mobility state, battery information, power preference indicator, ability to benefit from battery consumption optimization and physical layer category of the D2D UE.

In certain embodiments of the invention, the role of UEs and corresponding parameter configuration of a BS and the UEs may be dependent on a characteristic of the data. For example, for delay tolerant data, a UE's role may comprise that of device-to-device multicast transmitter, whereas for delay intolerant data, the UE's role may not comprise that of device-to-device multicast transmitter. A UE indicated by a BS or other network controller to perform the role of device-to-device multicast transmitter may perform said role selectively based on characteristics of received or expected to be received data. Other roles may be similarly data characteristic dependent. A BS may hence adapt its transmission parameters for data transmission based on the roles the UEs receiving transmissions are expected to adopt corresponding to the characteristics of the data. For example, a BS may transmit delay intolerant data with higher power resulting in a larger coverage area than for delay tolerant data expecting certain UEs given the role of device-to-device multicast transmitter to transmit the delay tolerant data using the indicated role, but not the delay intolerant data. A UE indicated by a BS or other network controller to perform certain roles may hence selective adapt its transmission and receiver parameters based on a characteristic of received or expected to be received data, corresponding to its own data characteristic dependent application of its indicated certain roles and/or those of at least one other UE.

Figure 5:
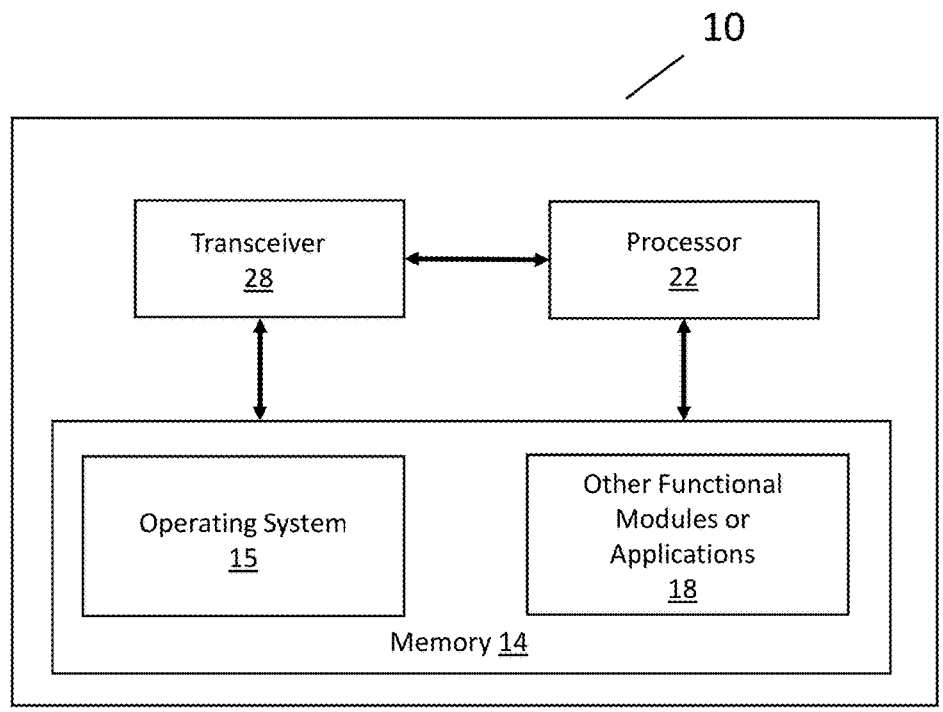
FIG. 5 illustrates an apparatus in accordance with embodiments of the invention.

FIG. 5 illustrates an apparatus 10 according to embodiments of the invention. Apparatus 10 can be a wireless device, such as a user equipment, for example. In other embodiments, apparatus 10 can be a base station, access point, software defined network (SDN) controller, cloud base station controller, or centralized base station controller, for example.

A wireless device or user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The wireless device or user equipment may be a sensor or smart meter, or other device that may usually be configured for a single location. Additionally, the wireless device or user equipment may be a device-to-device user equipment or a device for machine-type-communications.

Apparatus 10 can comprise a processor 22 for processing information and executing instructions or operations. Processor 22 can be any type of general or specific purpose processor. While a single processor 22 is shown in FIG. 5, multiple processors can be utilized according to other embodiments. Processor 22 can also comprise one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further comprise a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 can comprise program instructions or computer program code that, when executed by processor 22, enable the apparatus 10 to perform tasks as described herein.

Apparatus 10 can also comprise one or more antennas (not shown) for transmitting and receiving signals and/or data to and from apparatus 10. Apparatus 10 can further comprise a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 comprising, without limitation, precoding of antenna gain/phase parameters, encoding and decoding of individual bits forming a communication message, formatting of information, and overall control of the apparatus 10, comprising processes related to management of communication resources.

In certain embodiments, memory 14 stores software modules that provide functionality when executed by processor 22. The modules can comprise an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention.

Moreover, one having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

In an exemplary embodiment, an apparatus, such as a user equipment, D2D UE or base station, may include means for carrying out embodiments described above and any combination thereof.

We claim:

1. A base station, comprising:
at least one processor; and
at least one memory including computer program code, the at least one memory and the computer program code configured, with the at least one processor, to cause the base station at least to:
receive a data transmission to be forwarded to at least one first wireless device;
determine whether any of the data transmission is delay tolerant data or not;
based on determining that a first part of the data transmission is delay tolerant data:
define a role of at least one second wireless device to forward the first part of the data transmission with the delay tolerant data, and transmit the first part of the data transmission with the delay tolerant data to the at least one second wireless device to be forwarded to the at least one first wireless device; and
transmit a remainder of the delay tolerant data of the data transmission to the at least one first wireless device directly, wherein the transmitting directly comprises transmitting the remainder of the delay tolerant data of the data transmission using a direct connection from the base station to the at least one first wireless device instead of using the defined role of the at least second wireless device to forward the remainder of the delay tolerant data to the at least one first wireless device,
else, based on determining that none of the data is delay tolerant data:
transmit all of the data transmission to the at least one first wireless device directly.

2. The base station according to claim 1, wherein the at least one memory and the computer program code are configured, with the at least one processor, to cause the base station at least to:
estimate physical layer transmission parameters required to cover wireless devices by using a combination of macro cell and device-to-device multicast transmissions for defining the role of the at least one second wireless device.

3. The base station according to claim 2, wherein the at least one memory and the computer program code are configured, with the at least one processor, to cause the base station at least to:
define the physical layer transmission parameters of the base station to cover a part of wireless devices and define the at least one at least the second wireless device as a multicast transmitter to cover the rest of the wireless devices.

4. The base station according to claim 2, wherein the at least one memory and the computer program code are configured, with the at least one processor, to cause the base station at least to:
estimate the physical layer transmission parameters based on at least one of a measurement report and a capability of at least one wireless device for defining the role of the at least one second wireless device.

5. The base station according to claim 1, wherein the role of the at least one second wireless device comprises at least one of a role of a multicast broadcast multimedia systems data receiver, a device-to-device multicast transmitter and a device-to-device multicast data receiver.

6. The base station according to claim 1, wherein the at least one memory and the computer program code are configured, with the at least one processor, to cause the base station at least to:
transmit an indication of the role of the at least one second wireless device to the at least one second wireless device.

7. The base station according to claim 1, wherein the at least one memory and the computer program code are configured, with the at least one processor, to cause the base station at least to:
start a device-to-device discovery process by transmitting a configuration message to at least one device-to-device user equipment within a coverage area of the base station based on the determination.

8. The base station according to claim 7, wherein the at least one memory and the computer program code are configured, with the at least one processor, to cause the base station at least to:
receive a measurement report from the at least one device-to-device user equipment in response to the transmitted configuration message.

9. The base station according to claim 1, wherein the at least one memory and the computer program code are configured, with the at least one processor, to cause the base station at least to:
receive an indication of at least one capability of at least one user equipment, wherein the at least one capability is at least one of:
an ability to transmit and receive synchronized device-to-device multicast transmissions;
a transmit power class;
a mobility state;
a battery information;
a power preference indicator;
an ability to benefit from battery consumption optimization; and
a physical layer category.

10. The base station according of claim 1, wherein the at least one first wireless device is a device-to-device user equipment and the at least one second wireless device is a device-to-device user equipment.

11. A method, comprising:
receiving a data transmission to be forwarded to at least one first wireless device;
determining whether any of the data transmission is delay tolerant data;
based on determining that a first part of the data transmission is delay tolerant data:
defining, by a base station, a role of at least one second wireless device to forward the first part of the data transmission with the delay tolerant data, and transmitting, by the base station, the first part of the data transmission with the delay tolerant data to the at least one second wireless device to be forwarded to the at least one first wireless device; and
transmitting a remainder of the delay tolerant data of the data transmission to the at least one first wireless device directly, wherein the transmitting directly comprises transmitting the remainder of the delay tolerant data of the data transmission using a direct connection from the base station to the at least one first wireless device instead of using the defined role of the at least second wireless device to forward the remainder of the delay tolerant data to the at least one first wireless device:
else, based on determining that none of the data is delay tolerant data:
transmitting all of the data of the data transmission to the at least one first wireless device directly.

12. The method according to claim 11 further comprising:
estimating physical layer transmission parameters required to cover wireless devices by using a combination of macro cell and device-to-device multicast transmissions for defining the role of the at least one second wireless device.

13. The method according to claim 12 further comprising:
defining the physical layer transmission parameters of the base station to cover a part of wireless devices and defining the at least one second wireless device as a multicast transmitter to cover the rest of the wireless devices.

14. The method according to claim 12 further comprising:
estimating the physical layer transmission parameters based on at least one of a measurement report and a capability of at least one wireless device for defining the role of the at least one second device.

15. The method according to claim 11, wherein a role of at least one wireless device comprises at least one of a role of a multicast broadcast multimedia systems data receiver, a device-to-device multicast transmitter and a device-to-device multicast data receiver.

16. The method according to claim 11 further comprising:
receiving an indication of at least one capability of at least one user equipment, wherein the at least one capability is at least one of:
an ability to transmit and receive synchronized device-to-device multicast transmissions;
a transmit power class;
a mobility state;
a battery information;
a power preference indicator;
an ability to benefit from battery consumption optimization; and
a physical layer category.

17. The method according to claim 11, further comprising:
starting a device-to-device discovery process by transmitting a configuration message to at least one device-to-device user equipment within a coverage area of the base station based on the determination.

18. The method according to claim 17, further comprising:
receiving a measurement report from the at least one device-to-device user equipment in response to the transmitted configuration message.

19. The method according to claim 11, wherein the at least one first wireless device is a device-to-device user equipment and the at least one second wireless device is a device-to-device user equipment.

20. A computer program product, embodied on a non-transitory computer readable medium, configured to control a processor to perform a process comprising:
receiving a data transmission to be forwarded to at least one first wireless device;
determining whether any of the data transmission is delay tolerant data or not;
based on determining that the first part of data transmission is delay tolerant data:
defining, by a base station, a role of at least one second wireless device to forward the first part of the data transmission with the delay tolerant data, and transmitting, by the base station, the first part of the data transmission with the delay tolerant data to the at least one second wireless device to be forwarded to the at least one first wireless device; and
transmit a remainder of the delay tolerant data to the at least one first wireless device directly, wherein the transmitting directly comprises transmitting the remainder of the delay tolerant data of the data transmission using a direct connection from the base station to the at least one first wireless device instead of using the defined role of the at least second wireless device to forward the remainder of the delay tolerant data to the at least one first wireless device;
else, if the data is not determined as delay tolerant data:
transmitting the data to the at least one first wireless device directly.

\* \* \* \* \*